June 16, 1942.   C. C. FARMER   2,286,611
CIRCUIT CONTROL MEANS
Original Filed Nov. 6, 1937
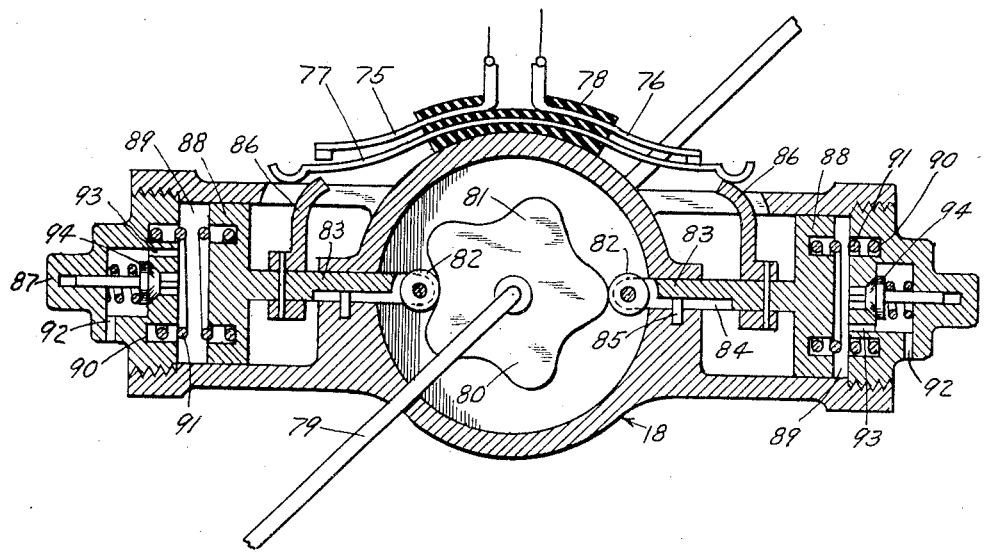
INVENTOR
CLYDE C. FARMER
BY
ATTORNEY Patented June 16, 1942

2,286,611

UNITED STATES PATENT OFFICE 2,286,611

CIRCUIT CONTROL MEANS

Clyde C. Farmer, Pittsburgh, Pa., assignor to The Westinghouse Air Brake Company, Wilmerding, Pa., a corporation of Pennsylvania Original application November 6, 1937, Serial No. 173,169, now Patent No. 2,191,822, dated February 27, 1940. Divided and this application July 29, 1939, Serial No. 287,233

3 Claims. (Cl. 200—30)

This invention relates to speed controlled switch devices for controlling electrical circuits and more particularly for controlling electric control circuits for railway train and traction vehicle brakes of the type in which the degree of braking is controlled with relation to the speed of the train or vehicle, such as disclosed in Patent No. 2,191,822 issued in my name February 27, 1940, of which the present application is a division.

In the brake equipment shown in the above mentioned application there is employed an electrical control circuit for controlling the operation of valve mechanism to modify the degree of application of the brakes from one value to another value which bears a substantially fixed relation to the first.

It is sometimes necessary to maintain the brakes applied while a train or vehicle is at rest. Such a period may extend over a rather long interval of time. If the brake apparatus employs an electrically operated valve mechanism, such as referred to above, it may occur that this electrically operated valve mechanism is maintained energized over this long standing period. The source of electric current available for energizing the electrically operated valve mechanism is usually a battery, and if the electrically operated valve mechanism is constantly energized from the battery for such long periods of time the charge on the battery may be depleted and electric energy may not be available during a running period when most needed. To avoid a possibility of depleting the source of electrical energy, it is preferred that the electrically operated valve device be deenergized after the train or vehicle has been brought to rest, and the brakes yet remain applied to a degree sufficient to insure that the train will not be moved unintentionally.

The principal object of the present invention is to provide a cut-out switch device which will function at or about the time the train or vehicle comes to rest or shortly thereafter to deenergize the electrically operated valve mechanism.

Other objects and advantages of the invention will appear in the following detailed description of the invention, taken in connection with the accompanying drawing, in which the single figure shows in diagrammatic form a cut-out switch device embodying the invention.

As shown in the drawing, the switch elements of the zero speed cut-out switch device generally indicated by the numeral 18 may comprise contact fingers 75 and 76, and bridging contact member 77. These three contact members are insulated from each other and are carried by an insulating member 78.

Within the switch device casing there is disposed a rotatable shaft 79 which is adapted to be rotated in a manner shown in the aforementioned patent having secured thereto a star-shaped cam 80. This cam is provided with an odd number of projections 81 which are adapted to engage rollers 82 associated with plungers 83. The plungers 83 have recesses 84 therein engaging pins 85 to prevent turning of the plungers in the bores in which they are disposed. Each plunger carries thereon a lug 86, which is adapted when the plunger is moved outwardly, that is, away from the cam 80, to engage one end of the bridging contact 77. When the plungers 86 are retracted inwardly toward the cam 80, they disengage from the respective ends of the bridging contact member.

Now when the shaft 79 is rotated the two plungers 83 are forced outwardly by intermittent engagement with the projections 81 of cam 80, and are maintained outwardly by the action of a dash-pot mechanism associated with each plunger. Each dash-pot mechanism comprises a piston 88 movable in a chamber 89. Disposed in the chamber 89 between the piston 88 and an annular groove 90 in a cap member 87 is a spring 91. Also, between the chamber 89 and an exhaust port 92 is a restricted port 93, while associated in parallel with the port 93 is an enlarged port controlled by a spring seated valve 94.

Upon a quick movement of the piston 88 outwardly a low pressure thus created in chamber 89 will unseat the valve 94, and the piston 88 may move with opposition exerted only by the spring 91. When the piston 88 tends to move inwardly toward the cam 80, by action of spring 91, the valve 94 seats and the admission of air to chamber 89 is by way of the restricted port 93. As a consequence, the movement of the piston 88 inwardly is greatly retarded.

It should now be obvious that once the two plungers 83 are actuated outwardly by rotation of the cam 80 the lug members 86 will remain in the outward position to cause the bridging contact 77 to engage and connect together the contact fingers 75 and 76, until such time as the cam 80 practically ceases rotating. When the cam 80 ceases rotating, at least one piston 88 is free to move inwardly, but due to the retarded action imposed by the restricted port 93 a short interval of time will elapse before it has moved inwardly far enough to permit the bridging contact member 77 to disconnect the contact fingers 75 and 76.

Operation

Assuming the zero speed switch device is disposed in a train or vehicle brake equipment such as shown in the aforementioned patent and the train is running, the shaft 79 will be driven at a speed corresponding to train speed. In the zero speed cut-out switch device 18, the lugs 86 will be forced outwardly and will remain there due to the action of the dash-pot mechanisms, and the two contact fingers 75 and 76 will be as a consequence connected together by the bridging contact 77.

As the train stops and the shaft 79 ceases rotating, the star-shaped cam 80 will assume a position such that at least one of the plungers 83 will be retracted inwardly toward the cam, such for example as is illustrated in the drawing. The bridging contact member 77 will then disconnect the contacts 75 and 76, and the control circuit will thus be interrupted.

It is to be observed, however, that due to the action of the dash-pot mechanism this interruption of the circuit will not take place until the elapse of a definite interval of time after the cam 80 has ceased rotating.

Having now described my invention, what I claim as new and desire to secure by Letters Patent, is:

1. A switch device for controlling an electric circuit, comprising in combination, rotatable means, a set of contacts adapted to maintain the circuit closed when said rotatable means is rotating above a predetermined speed and be opened when said rotatable means is brought to a stop, and means set in operation incident to the bringing of said rotatable means to a stop for delaying for an interval of time regardless of the position in which the rotatable means is stopped, the opening of said contacts.

2. A switch device for controlling an electric circuit, comprising in combination, a rotatable member, a set of contacts adapted to maintain the circuit closed when the rotatable member is rotating above a predetermined speed and to be opened when said member is brought to rest, control means movable in one direction for closing said contact and thereby the circuit and movable in another direction for opening said contacts and thereby the circuit, said rotatable member comprising a cam having a series of spaced radially extending projections adapted when the cam is rotating to successively engage and thereby maintain said control means in its contact closing position, said projections being so arranged that when the rotatable means is brought to rest the space between two of the projections will provide for movement of said control means relative to the rotatable means to its contact opening position, means for moving said control means to its contact opening position, and means for rendering regardless of the position in which the rotatable means is brought to rest the control means slow acting in its travel relative to the rotatable means.

3. A switch for controlling an electric circuit, comprising in combination, a rotatable member, two sets of contacts adapted to be operated to open or close said circuit and to maintain the circuit closed when the rotatable member is rotating above a predetermined speed one or the other of said sets of contacts being operative when the member is brought to rest to open the circuit, two plungers movable in opposite directions by said member when the member is rotating for actuating said contacts to close the circuit, one or the other of said plungers being automatically movable when said member is brought to rest to effect the operation of one of said set of contacts to open the circuit, and means for rendering the plunger which operates slow acting in its traverse to the contact opening position.

CLYDE C. FARMER.